US011422277B2

(12) United States Patent
Fu (10) Patent No.: US 11,422,277 B2
(45) Date of Patent: Aug. 23, 2022

(54) SEISMIC DATA FILTERING BASED ON DISTANCES BETWEEN SEISMIC SOURCES

(71) Applicant: BP Corporation North America Inc., Houston, TX (US)

(72) Inventor: Kang Fu, Katy, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 412 days.

(21) Appl. No.: 16/697,809

(22) Filed: Nov. 27, 2019

(65) Prior Publication Data

US 2021/0157021 A1 May 27, 2021

(51) Int. Cl.
*G01V 1/36* (2006.01)
*G01V 1/38* (2006.01)
*G01V 1/34* (2006.01)

(52) U.S. Cl.
CPC ............... *G01V 1/364* (2013.01); *G01V 1/34* (2013.01); *G01V 1/3808* (2013.01); *G01V 2210/1423* (2013.01); *G01V 2210/3246* (2013.01)

(58) Field of Classification Search
CPC ........ G01V 1/364; G01V 1/34; G01V 1/3808; G01V 2210/1423; G01V 2210/127; G01V 2210/3246
See application file for complete search history.

(56) References Cited

U.S. PATENT DOCUMENTS

| | | | |
|---|---|---|---|
| 5,581,514 A * | 12/1996 | Moldoveanu | G01V 1/3808 367/24 |
| 9,903,966 B2 * | 2/2018 | Hegna | G01V 1/3808 |
| 9,921,326 B2 * | 3/2018 | Forgues | G01V 1/364 |
| 2005/0068850 A1 * | 3/2005 | Muyzert | G01V 1/286 702/18 |
| 2008/0071477 A1 * | 3/2008 | Li | G01V 1/30 702/14 |
| 2009/0132170 A1 * | 5/2009 | Krueger | G01V 1/34 702/16 |
| 2013/0135966 A1 * | 5/2013 | Rommel | G01V 1/3826 367/24 |
| 2014/0241117 A1 * | 8/2014 | Dellinger | G01V 1/005 367/15 |
| 2017/0115419 A1 * | 4/2017 | van Groenestijn | G01V 1/32 |
| 2017/0176636 A1 * | 6/2017 | Adams | G01V 1/3808 |

* cited by examiner

*Primary Examiner* — Mohammad K Islam
(74) *Attorney, Agent, or Firm* — Conley Rose, P.C.

(57) ABSTRACT

Techniques for processing of seismic data. A seismic data set is received, wherein the seismic data set comprises a first data subset associated with a first seismic source and a second data subset associated with a second seismic source. An input is received indicating that a distance between the first seismic source and the second seismic source is greater than or equal to a threshold value. The second data set is filtered from the seismic data set to remove the second data subset from seismic data set to generate a filtered seismic data set in response to receiving the input and a coherence volume is generated based on the filtered seismic data set.

20 Claims, 8 Drawing Sheets

SEISMIC DATA FILTERING BASED ON DISTANCES BETWEEN SEISMIC SOURCES

BACKGROUND

The present disclosure relates generally to seismic image generation, and more specifically, to processing seismic waveforms resulting from seismic waves from multiple sources.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending acoustic energy down into the ground and recording the reflected acoustic energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave, acoustic wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

Over time, as hydrocarbons are being extracted from the subsurface region of the Earth, the location, saturation, and other characteristics of the hydrocarbon reservoir within the subsurface region may change. As such, it may be useful to determine how the image or map of the subsurface region changes over time, such that the operations related to extracting the hydrocarbons may be modified to more efficiently extract the hydrocarbons from the subsurface region of the Earth.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic acquisition utilizing sources and receivers may be useful in the generation of, for example, seismic images. Seismic images may be used, for example, in the determination of hydrocarbon deposits (e.g., areas within a subsurface that contain hydrocarbons) and/or subsurface drilling hazards. Seismic images are generally produced using seismic waveforms produced by a source, reflected off regions within a subsurface, and received by one or more receivers. The seismic image may be constructed using a high resolution seismic velocity model, such as full waveform inversion (FWI) model, a tomography model, or the like applied, for example, via a velocity model builder. The seismic velocity model may include data indicative of a change in velocity of the seismic waveforms during propagation through the subsurface region. The source that produces the seismic waveforms may be an active source (e.g., anthropogenic sources of seismic waves such as explosives or airguns), or a passive source (e.g., non-anthropogenic such as waves or wind). Certain techniques employ active sources due to the resulting high signal-to-noise ratio (SNR) of the seismic waveforms. Passive sources may complement active source seismic surveys. For example, passive sources may assist in the generation of velocity models of a near surface region (e.g., less than approximately 500 meters (m) below the surface of the Earth and/or a seafloor).

In addition to the examples provided above, image and/or data registration techniques may be used for various applications in seismic data processing, as described herein. For example, the systems and methods described below may be used for signal recovery associated with returned signals received during simultaneous source data acquisition. To elaborate, sometimes simultaneous sources are used to gather data to generate a seismic image. Simultaneous sources may provide many benefits in the generation of a seismic image, such as improved efficiency, improved resulting seismic images, and reduced cost, relative to non-simultaneous sources. Indeed, acquiring seismic data with shots where the recorded information from one shot overlaps in time with other shots may reduce (e.g., significantly reduce) time and/or cost of performing (e.g., shooting) a seismic survey. This approach may permit more closely spaced shot point intervals (e.g., during a marine survey) that may provide better seismic images and/or improve the chances of discovering economic quantities of oil, gas, and/or other resources. Simultaneously using multiple types of sources may permit for broader-bandwidth data to be acquired with the same efficiency as conventional air-gun data.

However simultaneous sources sometimes lead to particular challenges too, such as signal interferences which lead to data having weak-coherence (e.g., not coherent, non-coherent, lacking complete energy coherence). Seismic data is typically acquired within a certain time interval. However, in simultaneous source acquisition, the shot interval (i.e., the time between the generation of seismic signals from one or more sources) may be smaller than the desired seismic trace length (i.e., the time to register a trace transmitted from a seismic source to a receiver, where the trace represents response of the seismic signal to travel through a subsurface of the Earth) for seismic processing and imaging. Thus, seismic signals generated from neighboring shots (e.g., shots generated closely in time) may blend together, resulting in noise being blended into the data received by the receiver.

The blending noise may refer to signals received during data collection periods that interfere with a current data collection period and may be read as noise (e.g., weak-coherence energy or signal) despite being part of a primary signal (e.g., coherent energy or signal) for a subsequent input data (e.g., input seismic data) collection period. Deblending (used interchangeably herein with "deblending operation" or "deblending operations") refers to the techniques used to separate the signals such that signals generated by each shot are placed into the right data collection periods. In this way, the blending noise may refer to signals misplaced that are to be recovered and associated with their corresponding primary signals (e.g., corresponding coherent energy in a subsequent data collection period). In addition, in the case of multiple source activation, deblending may also refer to a reclassification of at least a portion of overlapping signals (e.g., a portion corresponding to one source but not another source) to return the at least a portion of overlapping signals to a data set corresponding to its actual source. However, when the seismic acquisition is less than ideal, weak-coherency signals may be contaminated by strong blending noise during deblending operations.

It is presently recognized that the distance between the sources used to generated the seismic data may adversely affect the time and cost of performing a seismic survey. That is, seismic data that includes shots from multiple sources when sources are separated by a relatively large distance (e.g., greater than 100 m) may result in noise that adversely affects the data processing time. For example, seismic data containing noise resulting from blended seismic data from seismic sources separated by a distance greater than a threshold distance requires longer time and computational resources to generate gathers, and ultimately, the seismic image. As such, it may be desired to develop and/or improve techniques associated with removing portions (e.g., secondary signals) of seismic data associated with sources that are at a greater distance than the primary signal.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Analysis of seismic data may provide valuable information, such as the location and/or change of hydrocarbon deposits within a subsurface region of the Earth. The present disclosure generally discusses techniques that may be used by a computing system to analyze a data set that includes weak-coherence (e.g., non-coherent) signals acquired from, for example, a seismic survey. Improvements to the processing of the seismic data and subsequent image generation may be made by removing secondary and/or tertiary signals from sources based on a distance between the sources associated with the signals present in seismic data.

In particular, a computing system may remove source-specific gathers from sources or source arrays when the distance between the sources/source arrays is relatively large (e.g., 100 m, 120 m, 150 m, 200 m, or more) The isolated signals may be processed and used to predict the values of the coherent signals to generate gathers for a coherence cube (or other volume) for a particular source, where the weak-coherence signals are removed prior to generating the coherence cube (i.e., a corresponding coherence cube is generated for each source/source array when the respective sources/source arrays are disposed at a distance above a threshold value, for example, 100 m, 120 m, 150 m, 200 m, or more). The coherence cube (or coherency cube) or other coherence volume may correspond to a data set representative of the shots filed by a particular seismic source taken over time, sliced at times corresponding to the shot time of the seismic source, and sorted into a 3-D cube based on the position of the shot (e.g., as part of a common receiver gather for a single receiver and different shots). When the energy is coming from the same source and the timing (i.e., the timing of the shot) is accurate, there should be coherence (i.e., similarity between waveforms or traces in the 2-D or 3-D seismic volume). However, other shots (e.g., transmitted from a separate source) and not at the time of a shot of interest that overlap with the timing window for reception of the trace of the shot of interest will be received as trace data as well, which will show up as noise (i.e., blending noise), which may include one or both of trace data from shots from other sources or from the same source that produced the shot of interest when activated at a different time than the shot of interest. An improved or filtered data set (e.g., the data set having complete data without blending noise) may be produced by removing secondary or tertiary signals resulting from sources/source arrays that are separated from a given source/source array associated with the primary signal, based on the distance between the sources/source arrays (i.e., separate coherence cubes may be generated for each source that is separated by a threshold distance from one another so as to remove the blended noise affecting the generation of a given coherency cube that would otherwise be present from the other distant sources).

It is presently recognized that the distance between the sources/source arrays may produce weak-coherence signals (or noise). Sometimes data sets generated from seismic surveys are organized, or analyzed, into one or more gathers. Each gather (e.g., data set) may correspond to signals received from a particular source. In this way, handling the data sets to eliminate overlap between the seismic signals received may improve deblending operations to sort signals received since the signals received are better able to be separated into respective gathers (e.g., respective gathers corresponding to different sources used in a seismic survey). In particular, in marine survey systems that employ widely separated sources (e.g., 500 m, 1 km, 1.5 km, 2 km, or more), the data sets may contain weak-coherence signals due to external noise sources, such as the movement of the cables pulling the streams that results in a variation of the receiver location. It is presently recognized that filtering data sets generated in the marine survey systems with widely separated sources based on the distance between the sources may improve the deblending operations. That is, sources/source arrays that are relatively close may remain grouped in a data set used to generate a coherence cube while sources/source arrays that are relatively far apart may be filtered from the data set (e.g., using matching filtering or weighting as discussed with respect to FIG. 8). Furthermore, since the computing device may perform various operations on the improved data set based at least in part on the predicted values used to replace the weak-coherence signals in the data set, computing system operations performed on the improved data set may improve relative to operations performed on data sets that did not use coherent signals to predict values for weak-coherence signals. Moreover, it is noted that the disclosed techniques may enable users to produce improved data sets even when the sources are widely separated. For example, fewer vessels with widely separated sources may be used to conduct the seismic surveys, which reduces the costs associated with conducting seismic surveys (e.g., by reducing the number of vessels), as discussed with respect to FIG. 7.

Figure 1:
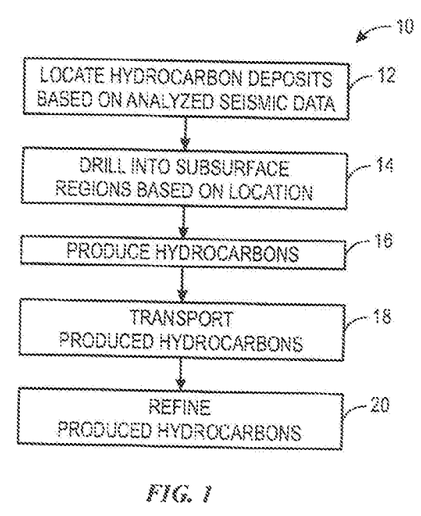
FIG. 1 illustrates a flow chart of various processes that may be performed based on analysis of seismic data acquired via a seismic survey system, in accordance with embodiments presented herein.
Figure 2:
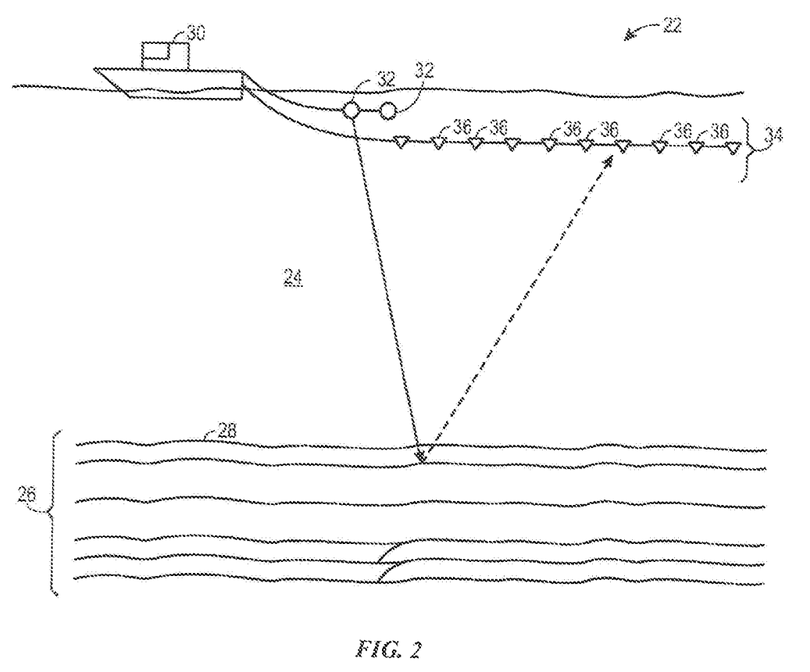
FIG. 2 illustrates a marine survey system in a marine environment, in accordance with embodiments presented herein.
Figure 3:
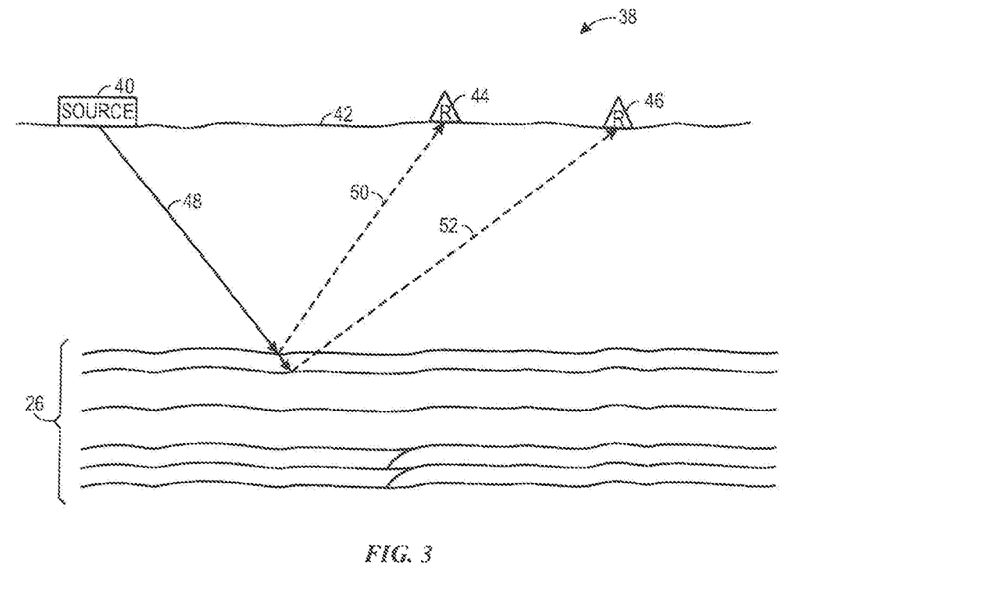
FIG. 3 illustrates a land survey system in a land environment, in accordance with embodiments presented herein.

By way of introduction, seismic data may be acquired using a variety of seismic survey systems and techniques, two of which are discussed with respect to FIG. 2 and FIG. 3. Regardless of the gathering technique utilized, after the seismic data is acquired, a computing system may analyze the acquired seismic data and use results of the seismic data analysis (e.g., seismogram, map of geological formations, or the like) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it is noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via one or more seismic acquisition techniques may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries, storage facilities, processing sites, and the like, via transport vehicles, pipelines, and the like. At block 20, the produced hydrocarbons may be processed according to various refining procedures to develop different products using the hydrocarbons.

It is noted that the processes discussed with regard to the method 10 may include other suitable processes that may be based on the locations and properties of hydrocarbon deposits as indicated in the seismic data acquired via one or more seismic survey. As such, it may be understood that the processes described above are not intended to depict an exhaustive list of processes that may be performed after determining the locations and properties of hydrocarbon deposits within the subsurface region.

With the forgoing in mind, FIG. 2 illustrates a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32 (which may represent a single seismic source or an array of seismic sources), a streamer 34, a receiver 36, and/or other equipment that may assist in acquiring seismic images representative of geological formations within a subsurface region 26 of the Earth. The vessel 30 may tow the seismic source 32 (e.g., an airgun array) that may produce energy, such as acoustic waves (e.g., seismic waveforms), that is directed at a seafloor 28. The vessel 30 may also tow the streamer 34 having a receiver 36 (e.g., hydrophones) that may acquire seismic waveforms that represent the energy output by the seismic sources 32 subsequent to being reflected off of various geological formations (e.g., salt domes, faults, folds, etc.) within the subsurface region 26. Additionally, although the description of the marine survey system 22 is described with one seismic source 32 (represented in FIG. 2 as an airgun array) and one receiver 36 (represented in FIG. 2 as a plurality of hydrophones), it is noted that the marine survey system 22 may include multiple seismic sources 32 and multiple seismic receivers 36. In the same manner, although the above descriptions of the marine survey system 22 is described with one seismic streamer 34, it is noted that the marine survey system 22 may include multiple seismic streamers 34. In addition, additional vessels 30 may include additional seismic sources 32, streamers 34, and the like to perform the operations of the marine survey system 22.

FIG. 3 illustrates a land survey system 38 (e.g., for use in conjunction with block 12 of FIG. 1) that may be employed to obtain information regarding the subsurface region 26 of the Earth in a non-marine environment. The land survey system 38 may include a (land-based) seismic source 40 and a (land-based) seismic receiver 44. In some embodiments, the land survey system 38 may include one or more multiple seismic sources 40 and one or more seismic receivers 44 and 46. Indeed, for discussion purposes, FIG. 3 includes a seismic source 40 and two seismic receivers 44 and 46. The seismic source 40 (e.g., seismic vibrator) may be disposed on a surface 42 of the Earth above the subsurface region 26 of interest. The seismic source 40 may produce energy (e.g., acoustic waves, seismic waveforms) directed at the subsurface region 26 of the Earth. Upon reaching various geological formations (e.g., salt domes, faults, folds) within the subsurface region 26, the energy output by the seismic source 40 may be reflected off of the geological formations and acquired or recorded by one or more land-based receivers (e.g., 44 and 46).

In some embodiments, the seismic receivers 44 and 46 may be dispersed across the surface 42 of the Earth to form a grid-like pattern. As such, each seismic receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first seismic receiver 44 may receive the reflection of the seismic waveform 48 off of one geological formation and a second receiver 46 may receive the reflection of the seismic waveform 48 off of a different geological formation. As such, the seismic first receiver 44 may receive a reflected seismic waveform 50 and the second receiver 46 may receive a reflected seismic waveform 52.

Figure 4:
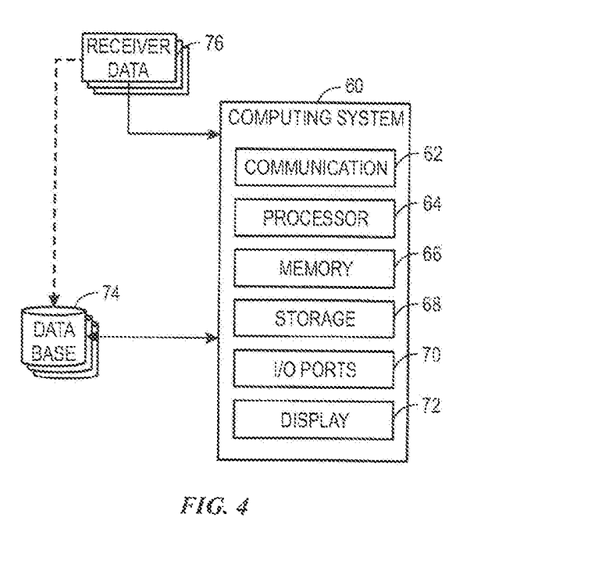
FIG. 4 illustrates a computing system that may perform operations described herein based on data acquired via the marine survey system of FIG. 2 and/or the land survey system of FIG. 3, in accordance with embodiments presented herein.

Regardless of how the seismic data is acquired, a computing system (e.g., for use in conjunction with block 12 of FIG. 1) may analyze the seismic waveforms acquired by the (marine-based) seismic receivers 36 or the (land-based) seismic receivers 44 and 46 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the receivers 36, 44, or 46 to determine the structure of the geological formations within the subsurface region 26.

Referring now to FIG. 4, the computing system 60 may include a communication component 62, a processor 64, memory 66 (e.g., a tangible, non-transitory, machine readable media), storage 68 (e.g., a tangible, non-transitory, machine readable media), input/output (I/O) ports 70, a display 72, and the like. The communication component 62 may be a wireless or wired communication component that may facilitate communication between the receivers 36, 44, 46, one or more databases 74, other computing devices, and other communication capable devices. In one embodiment, the computing system 60 may receive receiver data 76 (e.g., seismic data, seismograms) previously acquired by seismic receivers via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code or instructions to implement the methods described herein. The processor 64 may also include multiple processors that may perform the operations described below. The memory 66 and the storage 68 may be any suitable article of manufacture serving as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also store the data, analysis of the data, the software applications, and the like. The memory 66 and the storage 68 may represent tangible, non-transitory, computer-readable media (e.g., any suitable form of memory or storage) that may store the processor-executable code used by the processor 64 to perform various techniques described herein. It may be noted that tangible and non-transitory merely indicates that the media is tangible and is not a signal.

The I/O ports 70 are interfaces that may couple to other peripheral components such as input devices (e.g., keyboard, mouse), sensors, input/output (I/O) modules, and the like. The I/O ports 70 may enable the computing system 60 to communicate with the other devices in the marine survey system 22, the land survey system 38, or the like.

The display 72 may depict visualizations associated with software or executable code processed via the processor 64. In one embodiment, the display 72 may be a touch display capable of receiving inputs from a user of the computing system 60. The display 72 may also be used to view and analyze results of any analysis of the acquired seismic data to determine geological formations within the subsurface region 26, the location and/or properties of hydrocarbon deposits within the subsurface region 26, and/or the like. The display 72 may be any suitable type of display, such as a liquid crystal display (LCD), plasma display, or an organic light emitting diode (OLED) display. In addition to depicting the visualization described herein via the display 72, it may be noted that the computing system 60 may also depict the visualization via other tangible elements, such as paper (e.g., via printing), or the like.

With the foregoing in mind, the present techniques described herein may also be performed using a supercomputer employing multiple computing systems 60, a cloud-computing system, or the like to distribute processes to be performed across multiple computing systems. In this case, each computing system 60 operating as part of a super computer may not include each component listed as part of the computing system 60. For example, each computing system 60 may not include the display 72 since the display 72 may not be useful for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, or the like regarding the subsurface region 26.

Although the components described above have been discussed with regard to the computing system 60, it may be noted that similar components may make up the computing system 60. Moreover, the computing system 60 may also be part of the marine survey system 22 or the land survey system 38, and thus may monitor and/or control certain operations of the seismic sources 32 or 40, the receivers 36, 44, 46, or the like. Further, it may be noted that the listed components are provided as example components, and the embodiments described herein are not to be limited to the components described with reference to FIG. 4.

In some embodiments, the computing system 60 (e.g., the processor 64 operating in conjunction with at least one of the memory 66 or the storage 68) may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that may extend for some distance. In a two-dimensional (2-D) seismic survey, the receiver locations may be placed along a single line, whereas, in a three-dimensional (3-D) survey, the receiver locations may be distributed across the surface in a grid pattern. As such, a 2-D seismic survey may provide a cross sectional picture (vertical slice) of Earth layers present directly beneath the recording locations. A 3-D seismic survey, on the other hand, may create a data "cube" or volume that may correspond to a 3-D picture of the subsurface region 26.

In addition, a four-dimensional (4-D) or time-lapse seismic survey may include seismic data acquired during a 3-D survey at multiple times. Using the different seismic images acquired at different times, the computing system 60 may compare the two images to identify changes in the subsurface region 26.

In any case, a seismic survey may include a large number of individual seismic recordings (e.g., seismic traces, traces). As such, the computing system 60 may analyze the acquired seismic data and obtain an image representative of the subsurface region 26. The computing system 60 may use the image to determine locations and/or properties of hydrocarbon deposits. To that end, a variety of seismic data processing algorithms may be used to remove noise from the acquired seismic data, migrate the pre-processed seismic data, identify shifts between multiple seismic images, align multiple seismic images, or the like.

After the computing system 60 analyzes the acquired seismic data, the results of the seismic data analysis (e.g., seismogram, seismic images, map of geological formations, etc.) may be used to perform various operations within the hydrocarbon exploration and production industries. In some embodiments, the computing system 60 may provide an indication of the presence of hydrocarbons. As such, the computing system 60 may provide an indication of the subsurface region 26 that is likely to have hydrocarbons and provide a position (e.g., coordinates or a relative area) of regions that include the hydrocarbon deposits and/or (in some cases) subsurface drilling hazards. In other embodiments, the image generated in accordance with the present techniques may be displayed via the display 72 of the computing system 60, thus facilitating locating a region by a user of the computing system 60. Accordingly, the acquired seismic data may be used to perform the method 78 of FIG. 5 that details an example of the various processes that may be undertaken based on the analysis of the acquired seismic data to provide a seismic data analysis.

Figure 5:
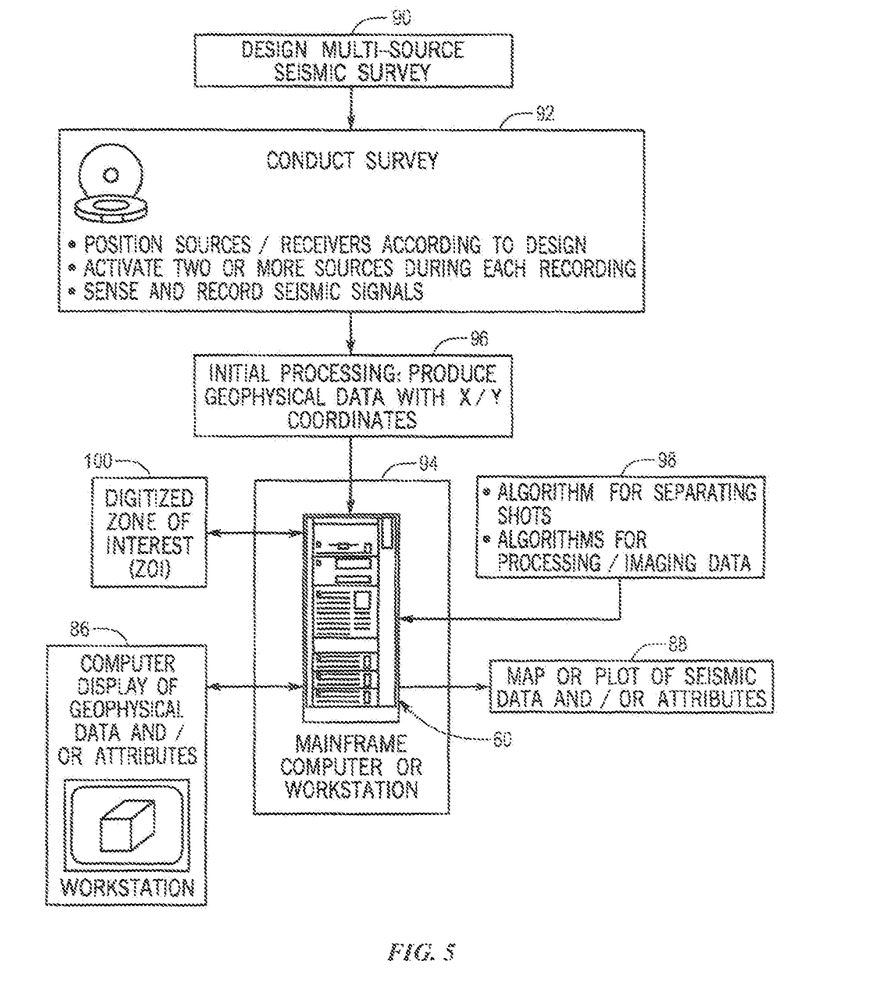
FIG. 5 illustrates the computing system of FIG. 4 receiving a survey design and analyzing data gathered according to the survey design, in accordance with embodiments presented herein.

In some embodiments, a seismic image may be generated in conjunction with a seismic processing scheme such as, for example, a computer display of geophysical data and/or attributes (block 86) or a map and/or plot of seismic data and/or attributes (block 88), such as a paper or printed map and/or plot, as illustrated in FIG. 5, by the computing system 60 (and more specifically, the processor 64 operating in conjunction with at least one of the memory 66 or the storage 68). FIG. 5 illustrates an example system that may use the techniques described herein. A seismic survey may be designed by an explorationist, or operator, (block 90) to cover a region of economic interest. Field acquisition parameters (e.g., shot spacing, line spacing, fold, source type, etc.) are typically selected during the design of the seismic survey, although it is common to modify ideal design parameters during actual execution of the seismic survey (e.g., in the field) to accommodate realities of conducting the survey.

Seismic data (e.g., seismic traces) may be collected during the execution of the seismic survey (block 92). The seismic data may be collected over a subsurface region (e.g., target) of economic interest and are typically sent thereafter to a processing center (block 94), where the traces are made more suitable for use in exploration. In some cases, there may be some amount of initial data processing performed while the data are still in the field and/or by the processing center (block 96). The initial data processing operations may facilitate preparing the seismic traces for analysis and/or use by the operator, and may involve retrieving and/or storing at least part of the seismic data into a memory. For example, on a storage device such as a hard disk, magnetic tape, solid state drive, magneto-optical disk, DVD disk, cloud storage, or other suitable storage technique. As described above, during the execution of the seismic survey there may be two more overlapping simultaneous sources of a same type, and/or there may be two or more overlapping simultaneous sources of different types. As described above, the recordings of different sources may have been combined in a single volume.

The computing system 60 may implement the described methods based at least in part on a software application storing instructions as depicted in block 98. The software application may be installed into the memory 66 and executable by the processor 64 (e.g., one or more processors) of the computing system 60 to execute algorithms for separating shots and/or for processing/imaging of the seismic data. Although not specifically depicted, the computing system 60 may include mainframes, servers, workstations, super computers, a network of computers supporting parallel computations (e.g., where a computational load may be distributed between two or more processors of the network of computers), or the like.

As is also illustrated in FIG. 5, in some embodiments, the computing system 60 may implement the described methods based at least in part on a digitized zone of interest (ZOI) model (e.g., represented via block 100). The ZOI model may be specified by the user and provided as input to the processing computer program. In the case of a 3-D seismic section, the ZOI model may include specifics as to the lateral extent and thickness (which might be variable and/or measured in time, depth, frequency, or the like) of a subsurface target. It is noted that the zones may be created, picked, digitized, stored, and later read during program execution using any suitable system and/or method.

Software applications (e.g., represented via the blocks 86, 88, 98, 100) may be conveyed into the computing system 60 via, for example, a floppy disk, a magnetic disk, a magnetic tape, a magneto-optical disk, an optical disk, a compact disc read-only memory (CD-ROM), a digital versatile disk (or digital video disk) (DVD), a random-access memory (RAM) card, flash random-access memory (RAM), a read-only memory (ROM) card, a programmable read-only memory (PROM) chip, or loaded over a network (e.g., a wired or wireless network, etc.). After processing, resulting traces may be sorted into gathers. The gathers may be stacked and/or displayed either via the display 72 (e.g., represented via the block 86) and/or as a printed seismic section or a map resulting from printing operations (e.g., represented via the block 88). The seismic interpreter may use the displayed images to assist in identification of subsurface features conducive to the generation, migration, and/or accumulation of hydrocarbons.

Figure 6:
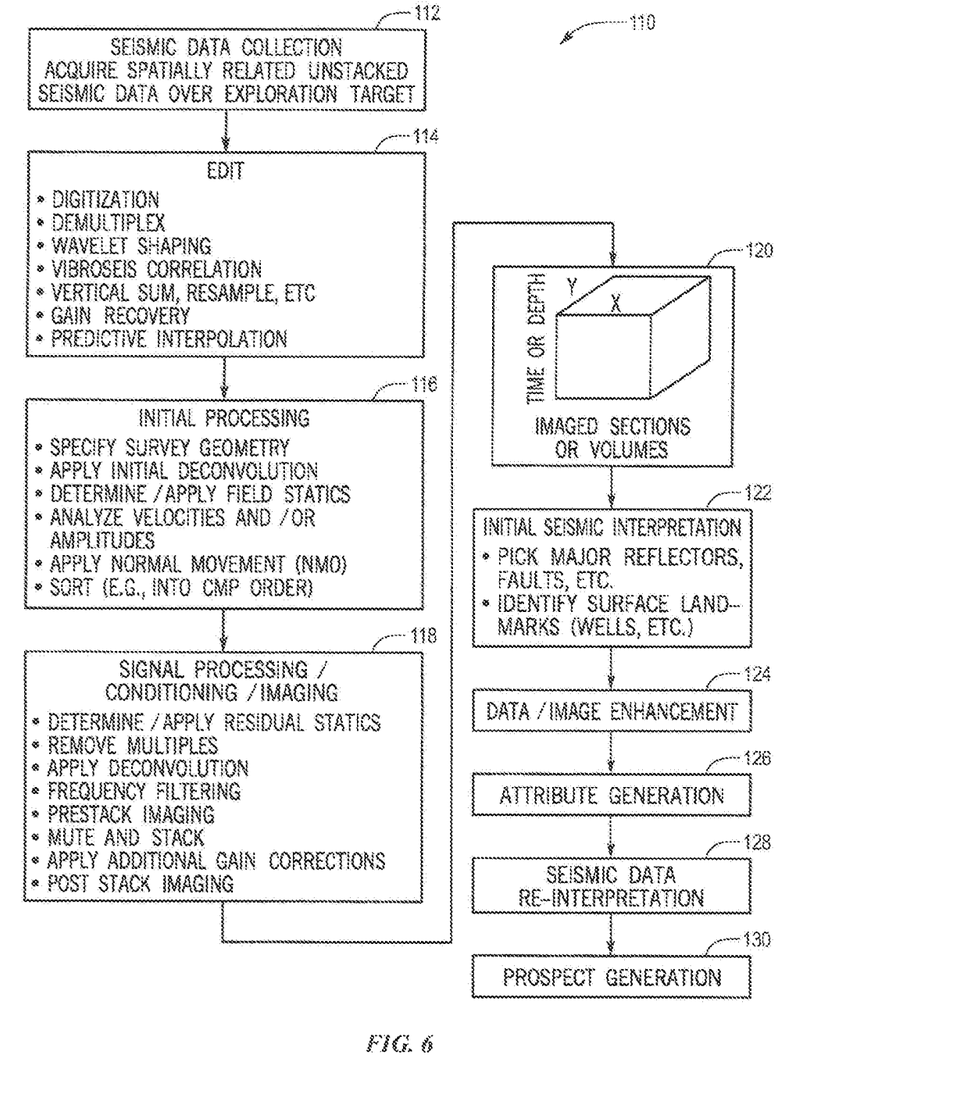
FIG. 6 illustrates a seismic processing sequence used by the computing system of FIG. 4 to receive data acquired and analyze the data acquired, in accordance with embodiments presented herein.

The above-described systems and methods may be used when performing seismic processing described in FIG. 6. FIG. 6 illustrates a method 110 for generating prospects and preparing seismic data for interpretation. Those of ordinary skill in the art may recognize that the processing steps illustrated in FIG. 6 broadly represent the processes that may be applied to seismic data and/or broadly represent the choice and/or an order of the processes. Any suitable techniques may be used and may vary from the depicted processes based at least in part on the individual seismic processor, signal source (e.g., dynamite, vibrator, airgun, low-frequency generator), survey location (e.g., land, sea) of the data, a company that processes the data, or the like. For ease of discussion, the computing system 60 is described as performing the method 110 below to prepare and analyze seismic data for prospect generation.

At step 112, the computing system 60 may conduct a seismic survey (e.g., 2-D, 3-D, 4-D, or the like) over a particular volume of the subsurface of the Earth. The data collected may include unstacked (e.g., unsummed) seismic traces. The unstacked seismic traces may include digital information representative of a volume of the Earth lying beneath the survey. The computing system 60 may use any suitable data collection technique. Note that for ease of description, the seismic survey performed at step 112 is a blended source survey where reflections from a later source activation may interfere with (or coincide in time with) reflections from an earlier one (e.g., a first activation of the source 40 interferences with a second and later activation of the source 40). After the shots or sources have been separated according to techniques described herein, the resulting unstacked seismic traces may be useable for additional seismic analysis. Thus, present systems and methods may permit multiple seismic traces to be obtained from sources 40 that produce overlapping signals based on the activation pattern of the sources 40. It is noted that the resulting separated seismic data sets are equivalent to or substantially equivalent to seismic data sets obtained using fully separated source activations and seismic data acquisitions (e.g., non-overlapping sources and unstacked seismic traces).

The purpose of a seismic survey is to acquire a collection of spatially-related seismic traces over a subsurface target of economic interest. Data suitable for analysis by systems and methods disclosed herein may include an unstacked 2-D seismic line, an unstacked 2-D seismic line extracted from a 3-D seismic survey, an unstacked 3-D portion of a 3-D seismic survey, or the like. For ease of discussion, traces included within a 3-D survey (stacked or unstacked as the discussion warrants) are discussed herein, however it should be appreciated that any assembled group of spatially related seismic traces may be used.

At step 114, the computing system 60 may edit (e.g., preparatory processing, initial processing) the acquired seismic data. Thus, the computing system 60 may edit the acquired seismic data in preparation for subsequent processing (e.g., digitization operations, demultiplexing operations, vertical summing, resampling, gain recovery, wavelet shaping, bad trace removal, predictive interpolation per methods or the like.

At step 116, the computing system 60 may perform additional processing (e.g., initial processing) to the acquired seismic data after editing operations of the step 114. The additional processing may include specification of the geometry of the survey and/or storing of a shot/receiver (e.g., receiver 44, 46) number and a surface location as part of each seismic trace header. Once the geometry has been specified, a velocity analysis may be performed and/or a normal move out (NMO) correction may be applied to correct each trace in time, thereby accounting for signal arrival time delays caused by offset. In some embodiments, computing system 60 may reference the editing operations from the step 114 during the processing operations of the step 116, such as in conjunction with or in place of the wavelet shaping/Vibroseis® correlation steps.

After completion of initial pre-stack processing (e.g., steps 114, 116), the computing system 60 may, at step 118, process, condition, and/or image the seismic signal on the unstacked seismic traces before creating stacked (e.g., summed) data volumes. The computing system 60 may generate a stacked seismic volume or, in the case of 2-D data, a stacked seismic line for use in the exploration for hydrocarbons within the subsurface of the Earth (e.g., represented within step 120). Any digital sample within a stacked seismic volume may be uniquely identified by one or more parameters or data fields. For example, a unique seismic volume may be identified via a (X, Y, TIME) triplet, where X and Y coordinates may represent some position on the surface of the Earth and the time coordinate may indicate a recorded arrival time within the seismic trace. For ease of discussion, as referred to herein the X direction corresponds to the "in-line" direction, and the Y direction corresponds to the "cross-line" direction, as the terms "in-line" and "cross-line" are generally understood in the art. Although time is a preferred vertical axis unit, those skilled in the art understand that other units may be used as the vertical axis units, for example, depth or frequency. Conversion of seismic traces from one axis unit (e.g., time) to another (e.g., depth) may be possible via mathematical conversion techniques.

At step 122, the computing system 60 may perform an initial seismic interpretation of the resulting stacked volume (e.g., represented within step 120), where principal reflectors and/or faults are located and identified wherever occurring in the stacked seismic volume (e.g., data set). The computing system 60 may perform, at step 124, additional data enhancement operation on the stacked seismic data and/or may perform, at step 126, an attribute generation operation on the stacked seismic data. In some cases, the computing system 60 may, at step 128, revisit or re-interpret an original interpretation of the stack seismic data in light of the additional information obtained from the data enhancement and/or attribute generation operations.

At step 130, the computing system 60 may combine information gleaned from the seismic data with other data to generate prospects, such as magnetic surveys, gravity surveys, Landsat program data, regional geological studies, well logs, well cores, or the like. The prospects may be used to locate subsurface structural or stratigraphic features conducive to the generation, accumulation, and/or migration of hydrocarbons, or the like.

Figure 7:
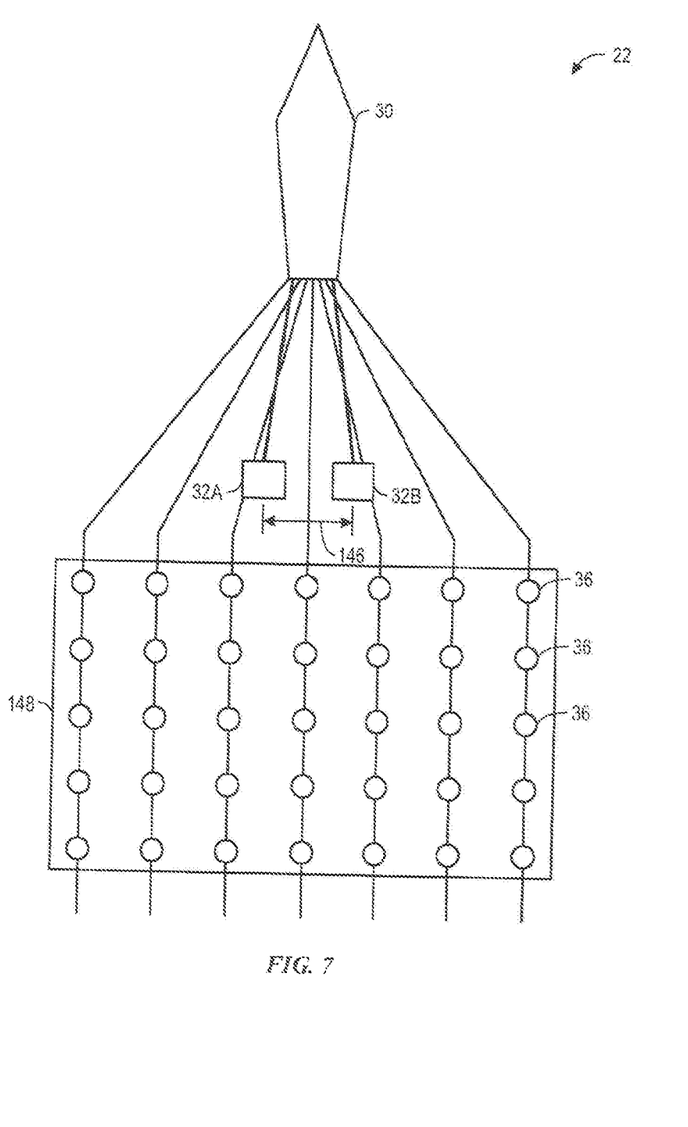
FIG. 7 illustrates a first example of a marine survey system in a marine environment that includes multiple sources separated by a distance, in accordance with embodiments presented herein.

Turning to the systems and methods disclosed herein, a method may include separating gather data from two or more seismic sources that have been activated during a single recording session based on a distance between the seismic sources. FIG. 7 illustrates an aerial view of the marine survey system 22 that may be employed to acquire seismic data of a subsurface region 26.

As shown in the illustrated embodiment of the marine survey system 22 of FIG. 7, the vessel 30 is towing two seismic sources 32a and 32b that are separated by a distance 146 and receivers 36. The seismic sources 32a and 32b may each represent a single seismic source 32 or may represent a seismic source array that includes more than one seismic source 32 (i.e., multiple sources 32 in each of seismic source 32a and/or seismic source 32b). Additionally, it is noted that more than two seismic sources 32a and 32b can be used in the seismic survey and may be additionally disposed by a distance 146 or another distance from one another and/or from the seismic sources 32a and 32b. Additionally, any number of suitable receivers 36 may be used in the seismic survey, such as the receivers discussed herein. The receivers 36 might be connected by a cable and/or via a wireless coupling to a central recording unit (e.g., the computing system 60) to store seismic signals received and/or each receiver 36 might use some amount of internal data storage to store data associated with the seismic signals received. In general, the seismic source 32a and the seismic source 32b and receivers 36 cooperatively operate to generate seismic data indicative of formation properties within a volume.

In some embodiments, the receivers 36 may record the data associated with the seismic signals for a period of time, for example a few seconds after the activation of a seismic source 32a or a seismic source 32b (or one of the sources 32 therein when the source 32a or a source 32b is a seismic source array). While the receivers 36 record, seismic source 32a (as a single source 32 or as more than one seismic source 32 when seismic source 32a is a seismic source array) and seismic source 32b (as a single source 32 or as more than one seismic source 32 when seismic source 32b is a seismic source array) may be activated at different locations within the survey area 148 at neighboring times and/or at the same time. In some embodiments, the two or more seismic sources 32a and 32b (or one or more sources 32 therein when the seismic sources 32a and 32b are seismic source arrays) each use a different (e.g., not equal) source signature and/or frequency range.

As previously noted, the two or more seismic sources 32a and 32b may include any number of discrete and/or continuous sources. In a marine context, the seismic sources 32a and 32b may include one or more airguns, sparkers, vibrators, or the like. In some embodiments, any number, volume, and/or type of seismic sources 32 may be included in a seismic source array represented by seismic sources 32a and 32b. As an example, a seismic source array may include one or more large volume airguns, one or more medium volume airguns, and/or one or more small volume airguns. The seismic sources 32 in the seismic source arrays may be arranged in various arrays. For example, the seismic source array may position a collection of seismic sources 32 proximate to each other and be intended to activate as part of a same seismic shot. Furthermore, a subarray (which might include one or more sources 32 of the seismic source array) will be understood to be a subset of the seismic source array, with the sources 32 assigned to each subarray able to be activated simultaneously. It is noted that seismic sources 32 may be of a marine context and/or of a land context (or on land). In this way, any number of any suitable seismic sources 32 may be used in the seismic survey, such as the seismic source 32 (e.g., marine context) and/or the seismic source 40 (e.g., land context) described above.

If disposed on land, the two or more seismic sources 32a and 32b may include vibrators, charges, humming seismic sources, or the like. For example, the two or more seismic sources 32a and 32b may include land vibrators (e.g., about 10, 8-12), Mini-Sosie™ surveys, weight drop surveys, or the like. One type of seismic surveying system uses a vibrator or group of vibrators to provide the acoustic energy (hereinafter referred to as "Vibroseis source"). A Vibroseis source may generate ("vibrate") the acoustic energy waves at predetermined vibrator points (VPs). The VPs may be physically marked with a stake placed before initiation of the survey. Additionally or alternatively, global positioning satellite (GPS) equipment may be used to locate predetermined VPs.

Other seismic sources 32 may include low-frequency seismic sources 32 such as those used in marine surveys, including Wolfspar® sources. The low-frequency seismic sources 32 may each operate at a single frequency (e.g., monochromatic low-frequency sources), cycle between two or more discrete frequencies (e.g., stepped-frequency low-frequency sources), and/or sweep over a narrowband range of low frequencies designed to augment the frequency range produced by the broadband sources (e.g., narrowband low-frequency sources). The seismic sources 32 may operate to produce acoustic waves having constant (e.g., substantially similar) amplitudes, or the amplitude of the waves may vary (e.g., taper up and down). In this context, "low-frequency" refers to frequencies less than about 6-8 Hertz (Hz). Some embodiments may use frequencies below about 4 Hz (e.g., 2 Hz, 1.5 Hz, 0.5 Hz, or the like).

In some embodiments, the two or more seismic sources 32a and 32b may use different signatures. In Vibroseis operations, the vibrator(s) of the Vibroseis source 32 may generate a vibration pattern that changes frequency over a predetermined period of time. This vibration pattern may be referred to as a vibratory sweep. A typical Vibroseis sweep may be a linear frequency sweep from approximately 5 Hz to 100 Hz and may have a duration of the order of 5 to 30 seconds. Airguns may generate high-frequency acoustic waves. The low-frequency seismic sources 32 may generate low-frequency signals over a longer time period, and in some embodiments, the low-frequency seismic sources 32 may operate continuously.

In some embodiments, random time periods may separate activations of the seismic sources 32a and 32b (and/or the seismic sources 32 therein when the seismic sources 32a and 32b are a seismic source array). Further, the seismic sources 32a and 32b may be activated in time such that at least a portion of the shots overlap or blend. A threshold parameter may be used to define a suitable amount of overlap or blending between the seismic sources 32a and 32b. When the seismic records are corrected for each zero time (e.g., activation time) of a seismic source (e.g., seismic source 32a), the reflections related to that source 32a tend to be coherent (e.g., described herein as coherent signals). However, sometimes the reflections also include weak-coherence or incoherent signals. For example, the energy from interfering sources may be of weak coherence or generally incoherent (e.g., reflections do not line up, non-coherent signals) since delay between shots is random. That is, for example, in the case of a survey where each seismic source 32a and 32b is a Vibroseis unit, the activations of the seismic sources 32a and 32b may be separated by a few seconds. Note that FIG. 7 is not intended to suggest that each seismic sources 32a and 32b is activated simultaneously but instead to indicate that each source is located at a different location within the survey area 148. During some surveys, three, four, five, or more different seismic sources disposed in a similar pattern to seismic sources 32a and 32b might be used. An example exploration method that may produce data suitable for use with the techniques described herein is discussed in Patent Cooperation Treaty Patent Application No. WO 2008/025986 (PCT/GB2007/003280) "Seismic Survey Method" which names Howe as its sole inventor and is incorporated herein by reference in its entirety. Howe discusses the use of staggered activation of vibrator activations wherein there is some overlap in the returning sub surface reflections.

While the seismic sources 32a and 32b may include discrete or semi-discrete signatures, one or more of the seismic sources 32a and 32b may continuously operate based at least in part on a continuous firing pattern and/or as a continuous emission source. In some embodiments, "continuous firing pattern" may refer to continuous shooting, and also may be referred to as "continuous patterned shooting" and/or "continuous firing patterns." Specifically, instead of shooting one firing pattern and then shooting a different firing pattern, there may be no time delay between activation of the seismic sources 32a and 32b (or in the seismic sources 32 therein) and a continuous firing pattern may be used (e.g., continuous popcorn-type firing pattern in the case of airgun arrays). As such, in some embodiments, there may be gaps of a few seconds to several seconds between two firing patterns. Low-frequency sources as the seismic sources 32a or 32b or as part thereof of one or both of seismic sources 32a and 32b may operate continuously over a given time period to produce the low-frequency energy in a continuous manner.

As described above, different types of seismic sources 32a and 32b (or seismic sources 32 as a portion of one or both of seismic sources 32a and 32b) may have different characteristics. The different seismic sources 32a and 32b may use different signatures and/or different frequency ranges based at least in part on differences in the source signatures, relevant coherency criteria, and/or acquisitions processes (e.g., 2-D acquisition, 3-D acquisition, and so on) to provide improved separation in the acquired data. For example, combinations may include using air-guns with vibrators, air-guns with sparkers, air-guns with a low-frequency source (e.g., a Wolfspar source, etc.), and/or combinations of three or more source types, or the like.

The data acquired by the receivers 36 may be used to generate a coherence cube or other volume. The coherence cube (or coherency cube) may correspond to a data set representative of the shots filed by a particular seismic source taken over time, sliced at times corresponding to the shot time of the seismic source, and sorted into, for example, a 3-D cube based on the position of the shot (e.g., as part of a common receiver gather for a single receiver and different shots). When the energy is coming from the same source and the timing (i.e., the timing of the shot) is accurate, there should be coherence (i.e., similarity between waveforms or traces in the 2-D or 3-D seismic volume). However, other shots (e.g., transmitted from a separate source) and not at the time of a shot of interest that overlap with the timing window for reception of the trace of the shot of interest will be received as trace data as well, which will show up as noise (i.e., blending noise), which may include one or both of trace data from shots from other sources or from the same source that produced the shot of interest when activated at a different time than the shot of interest.

Generating the coherence cube may be less efficient when a distance between the seismic sources 32a and 32b is relatively large. That is, it is presently recognized that it may be advantageous to generate a first coherence cube associated with the first seismic source 32a and a second coherence cube associated with the second seismic source 32b (i.e., separate coherence cubes may be generated for each seismic source 32a and 32b separated by a threshold distance from one another so as to remove the blended noise affecting the generation of a given coherency cube that would otherwise be present from the other source 32a or 32b). The threshold distance may be, for example, approximately 100 m, 120 m, 150 m, 200 m, or a greater value. Further, as noted above, generating a first coherence cube associated with the first seismic source 32a and generating a second coherence cube associated with the second seismic source 32b when each seismic source 32a and 32b are separated by the threshold distance may enable users to generate improved data sets even when the seismic sources (e.g., 32a and 32b) are widely separated. That is, users may employ fewer vessels 30 with seismic sources 32 separated by a distance similar to or greater than the threshold distance to generate data sets. It should be appreciated by one of ordinary skill in the art that employing fewer vessels reduces the cost associated with seismic surveys.

Figure 8:
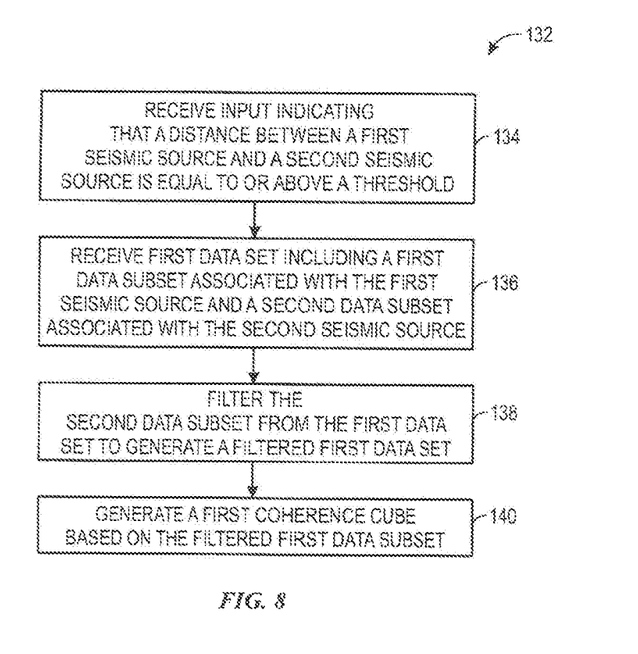
FIG. 8 illustrates a flow chart of a method for separating seismic data based on a distance between seismic sources used to generate the seismic data, in accordance with embodiments presented herein.

FIG. 8 illustrates a flow chart of a method 132 generating a coherence cube from an improved data set that is generated by removing source-specific gathers based on the distance between respective seismic sources 32a and 32b, but can be applied to generate more generally a coherence volume as the result of method 132 (i.e., generation of the coherence cube is described as one option for simplicity, but the method of 132 can be applied to generate other coherency volumes). Although the following description of the method 132 of FIG. 8 is detailed and described as being performed by the computing system 60, it should be understood that the method 132 may be performed by any suitable computing system, computing device, and/or controller. In this way, it should also be understood that some or all of the below described processing operations may be performed by one or more components of the computing system 60, including the processor 64 in conjunction with the memory 66, or the like, and may be executed by the processor 64, for example, executing code, instructions, commands, or the like stored in the memory 66 (e.g., a tangible, non-transitory, computer-readable medium).

At step 134, the computing system 60 may receive an input that the distance between multiple seismic sources 32a and 32b used to generate seismic data was a particular value or an input that the distance between the multiple seismic sources 32a and 32b used to generate seismic data is equal to or above a threshold (i.e., a single coherence cube may be generated when the seismic sources 32a and 32b are less than a threshold distance away from one another while separate coherence cubes for each of the seismic sources 32a and 32b are generated by method 132 when the seismic sources 32a and 32b are equal to or more than threshold distance away from one another). The input received by the computing system may be part of the received seismic data or, for example, may be a user input, a setting that may be engaged on the computing system 60, or another input to initiate the computing system 60 for operating according to method 132. Regardless, step 134 includes setting, setting-up, configuring, or otherwise initiating the computing system 60 to perform the remaining steps of method 132 so as to generate separate coherence cubes for seismic sources 32a and 32b.

As discussed herein, it is presently recognized that processing source-specific gather from sources that are separated by a relatively long distance results in expensive and time-consuming data processing due to the noise generated by distant source-specific gathers. Accordingly, the input from step 134 may indicate that a set of seismic data associated with certain set(s) of seismic sources 32a and 32b should be processed together (i.e., when the seismic sources 32a and 32b are separated by a distance less than a threshold value), and indicate that other sets of seismic data should not be processed together (e.g., when the seismic sources 32a and 32b are separated by a distance equal to or greater than a threshold value). That is, the input and/or the setting, setting-up, configuring, or otherwise initiating the computing system 60 to perform the remaining steps of method 132 indicates when seismic data associated with seismic sources 32a and 32b are at a distance equal to or greater than a threshold value should be filtered from the received set of seismic data (i.e., to generate a respective coherence cube for each of the seismic sources 32a and 32b).

At step 136, the computing system 60 may receive a first data set that includes a first subset of data associated with a first seismic source 32a a second subset of data associated with a second seismic source 32b. For example, the first data set may be source-specific gathers with a first source-specific gather associated with a first seismic source and a second source-specific gather associated with a second seismic source.

At step 138, the computing system 60 may separate or filter the second subset of data from the first data set, resulting in a filtered first data set that includes the first subset of data. Filtering of the seismic data when the seismic data is associated with seismic sources 32a and 32b at a distance equal to or greater than a threshold value may include using a comb filter or performing comb filtering. Comb filtering may be performed by slicing a time window from the continuous recording for a given shot (named a trace from the given shot) with the start time of the window being the time of seismic source excitation of the given shot, repeating the slicing operation for every shot, and sorting the traces based on desired shot grid. Additional filtering techniques applicable in step 138 include the application of matched filtering or weighting filtering, for example, when the source signature from each of the sources 32a and 32b is different. The filtering of the data in step 138 will allow for only data from one seismic source (e.g., seismic source 32a) to be utilized in the subsequent processing of the seismic data. At step 140, the computing system 60 may proceed with processing the seismic data to generate a first coherence cube based on the filtered first data set (e.g., one or more of steps 116, 118, 120, 122, 124, 126, 128, and 130).

In some embodiments, the computing system 60 may determine whether to separate the first data subset and the second data subset based on a comparison between the distance between the two sources 32a and 32b associated with the first subset of data and the second subset of data with respect to a threshold. The threshold may be predetermined, selected by an operator, or generated based on the dimensions and/or area of a survey area 148. For example, the threshold may be a fraction of a dimension of the area such as ⅔, ½, ⅓, ¼, and the like. The threshold may also be equivalent to the distance between streamers carrying the receivers 36 in the survey area 148 or, for example, a portion (i.e., approximately 95%, 90%, 85%, 80%, 75%, 70%, or another value) of the distance between streamers carrying the receivers 36 in the survey area 148. In some embodiments, the threshold may be stored in the memory 66 and retrieved by the processor 64.

In some embodiments, such as when the distances between two sources are substantially close (e.g., less than 10%) to the threshold, the computing system 60 may prompt the operator for a second input to determine whether to proceed to step 136. In some embodiments, the computing system 60 may automatically make a default determination to proceed with the step 136 when the distances between the two sources are substantially close to the threshold. For example, the computing system 60 may determine not to separate a subset of seismic data associated with seismic sources 32a and 32b when the respective distances between the sources are substantially close to (i.e., 10% or less) the threshold value.

Figure 9:
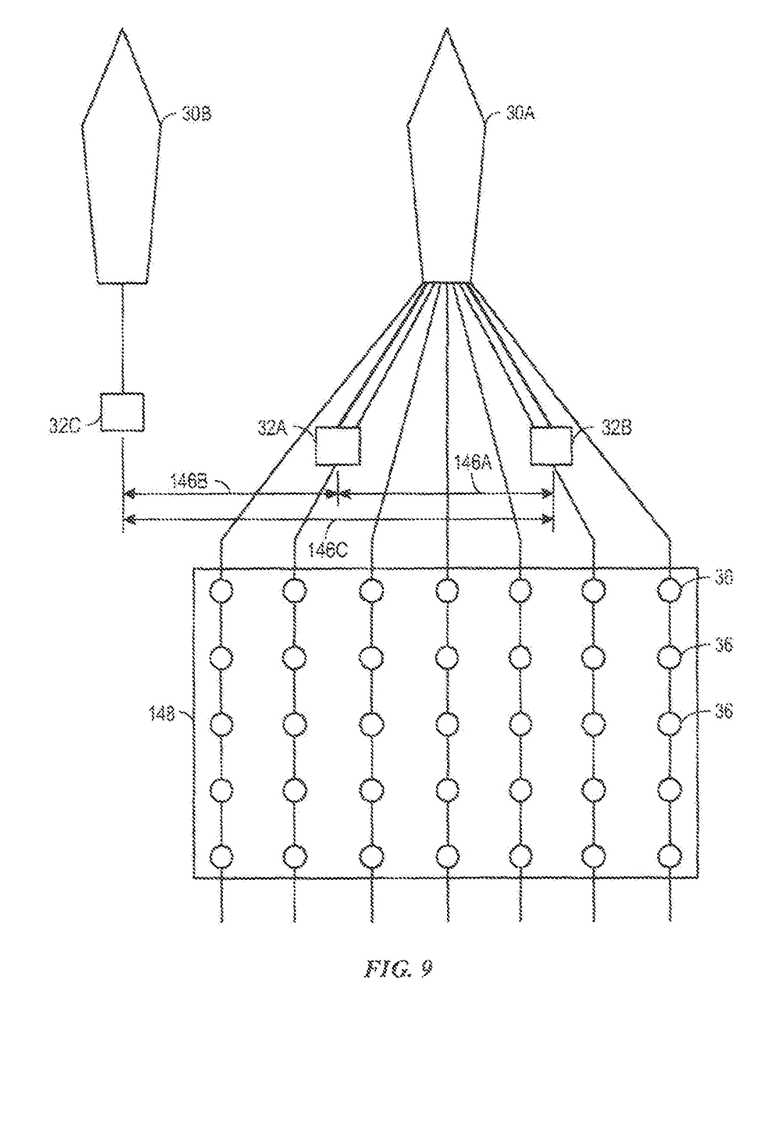
FIG. 9 illustrates a second example of a marine survey system in a marine environment that includes multiple sources separated by a distance, in accordance with embodiments presented herein.

An example of seismic acquisition and the data collected therefrom that may benefit from the method 132 of FIG. 8 is illustrated in FIG. 9. FIG. 9 illustrates an aerial view of a marine survey system 22 that includes two vessels 30a and 30b, three seismic sources 32a, 32b, and 32c, and receivers 36. To further illustrate the input provided in step 134 of the method 132 may include, FIG. 9 illustrates an aerial view of a marine survey system 22 that includes a vessels 30a and 30b, three seismic sources 32a, 32b, and 32c, and receivers 36. As shown in the illustrated embodiment of the marine survey system 22 of FIG. 8, the vessel 30a is towing two seismic sources 32a and 32b that are separated by a distance 146a. Additionally, the vessel 30b is towing multiple receivers 36. The illustrated embodiment of the marine survey system 22 of FIG. 8 also includes a vessel 30b that is towing a seismic source 32c. Not illustrated are receivers 36 that may be towed by vessel 30b.

The seismic source 32c is separated from the seismic source 32a by a distance 146b, and the seismic source 32c is separated from the seismic source 32b by a distance 146c. In some embodiments, the distance 146a and 146c may each be greater than or equal to the threshold distance discussed in conjunction with method 132. Accordingly, method 132 may be utilized to generate separate coherence cubes associated with each of seismic sources 32a and 32b. In some embodiments, the distance 146b may also be greater than or equal to the threshold distance discussed in conjunction with method 132. Thus, method 132 may also be utilized to generate a separate coherence cube associated with seismic source 32c.

However, it is also envisioned that the distance 146a and 146c may each be greater than or equal to the threshold distance discussed in conjunction with method 132 and the distance 146b would be 132a, 32b, 32c, and 32d. In this situation, two coherence cubes would be generated via method 132; a first coherence cube would be associated with seismic source 32b and a second coherence cube would be associated with seismic sources 32a and 32c (i.e., the data from seismic source 32b would be filtered out and separated from the data associated with seismic sources 32a and 32c).

Figure 10:
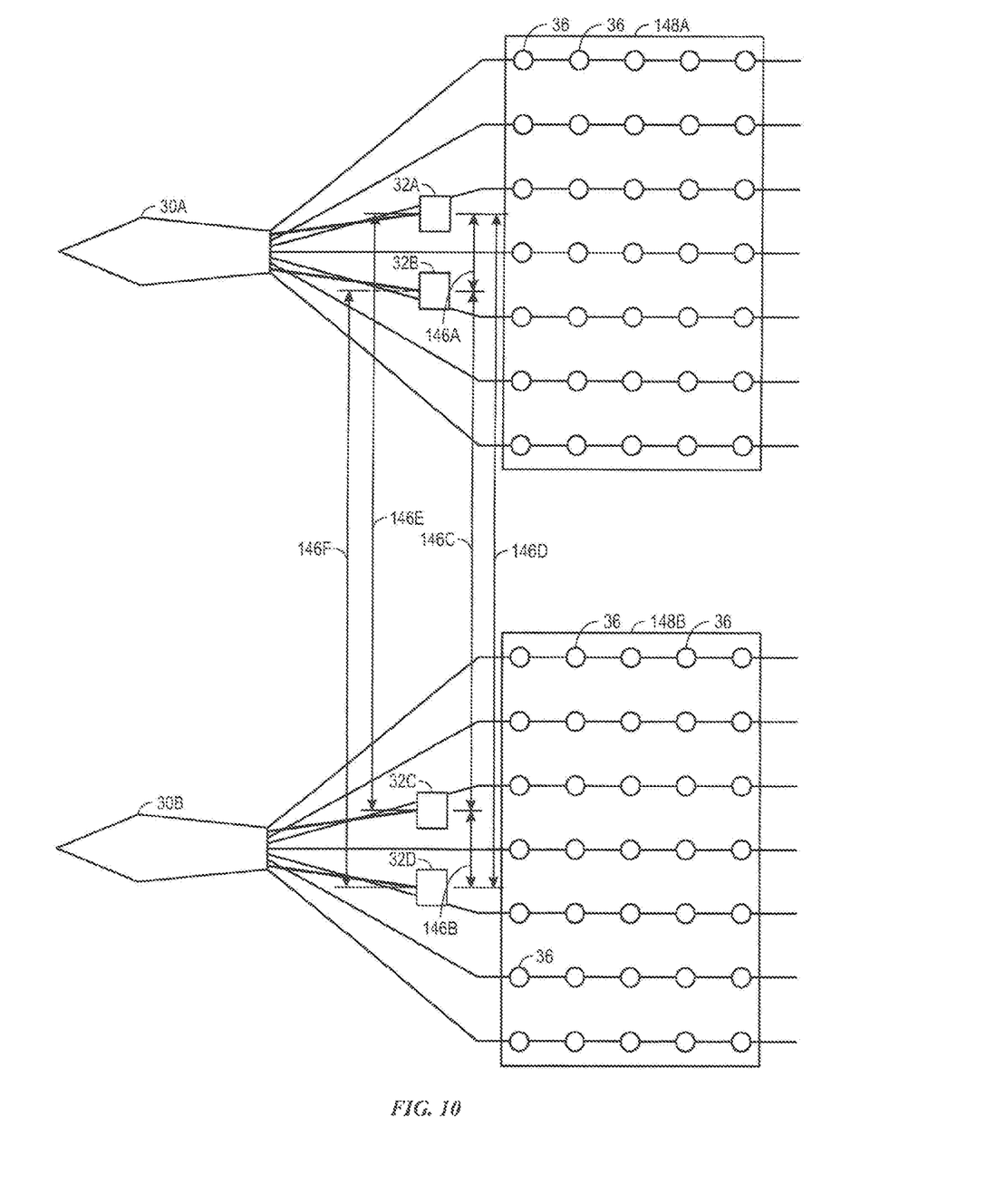
FIG. 10 illustrates a third example of a marine survey system in a marine environment that includes multiple vessels that are each towing multiple sources separated by a distance, in accordance with embodiments presented herein.

A second example of seismic acquisition that may benefit from the method 132 of FIG. 8 is illustrated in FIG. 10. FIG. 10 illustrates another embodiment of an aerial view of a marine survey system 22 that includes two vessels 30a and 30b, four seismic sources 32a, 32b, 32c, and 32d, and receivers 36a and 36b. As shown in the illustrated embodiment of the marine survey system 22 of FIG. 10, the vessel 30a is towing two seismic sources 32a and 32b that are separated by a distance 146a. Additionally, the vessel 30a is towing multiple receivers 36a that are utilized over survey area 148a. Vessel 30b is towing seismic sources 32c and 32d that are separated by a distance 146b. Additionally, the vessel 30b is towing multiple receivers 36b that are utilized over survey area 148b.

As illustrated, seismic source 32a and seismic source 32d are separated by a distance 146d while seismic source 32a and seismic source 32c are separated by a distance 146e. Likewise, seismic source 32b and seismic source 32c are separated by a distance 146c and seismic source 32b and seismic source 32d are separated by a distance 146f. In some embodiments, the distance 146a and 146b (as well as the distances 146c, 146d, 146e, and 146f) may each be greater than or equal to the threshold distance discussed in conjunction with method 132. Accordingly, method 132 may be utilized to generate separate coherence cubes associated with each of seismic sources 32a, 32b, 32c, and 32d. That is, the data from seismic sources 32b, 32c, and 32d would be filtered out and separated from the data associated with seismic source 32a to form the first coherence cube. Likewise, the data from seismic sources 32a, 32c, and 32d would be filtered out and separated from the data associated with seismic source 32b to form the second coherence cube. Similarly, the data from seismic sources 32a, 32b, and 32d would be filtered out and separated from the data associated with seismic source 32c to form the third coherence cube and the data from seismic sources 32a, 32b, and 32c would be filtered out and separated from the data associated with seismic source 32d to form the fourth coherence cube the data from seismic sources 32b, 32c, and 32d would be filtered out and separated from the data associated with seismic source 32a to form the first coherence cube.

However, it is also envisioned that the distance 146a and 146b may each less than the threshold distance discussed in conjunction with method 132 and distance 146c, 146d, 146e, and 146f would be greater than the threshold distance discussed in conjunction with method 132. In this situation, two coherence cubes would be generated via method 132; a first coherence cube would be associated with seismic sources 32a and 32b and a second coherence cube would be associated with seismic sources 32c and 32d. That is, the data from seismic sources 32c and 32d would be filtered out and separated from the data associated with seismic sources 32a and 32b to form the first coherence cube. Likewise, the data from seismic sources 32a and 32b would be filtered out and separated from the data associated with seismic sources 32c and 32d to form the second coherence cube.

As such, utilizing distance information between the seismic sources 32a, 32b, 32c, and 32d, the method of 132 can be selectively applied to various data sets to generate coherence cubes for data collected from seismic sources 32a, 32b, 32c, and 32d that are less than the threshold distance discussed in conjunction with method 132. Doing so allows for coherence cubes to be generated that minimize blending noise from other seismic sources 32a, 32b, 32c, and 32d (or from the sources 32 therein, when one or more of the 32a, 32b, 32c, and 32d are seismic source arrays). In this manner, interference from widely separated sources (e.g., when the distance between the sources/source arrays is relatively large, such as approximately 100 m, 120 m, 150 m, 200 m, or more) may be reduced to allow for increases in the reliability of the seismic processing and imaging of the seismic data.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
imparting, by a first seismic source, a first plurality of seismic signals associated with a first data subset;
imparting, by a second seismic source, a second plurality of seismic signals associated with a second data subset;
receiving a seismic data set comprising the first data subset associated with the first seismic source and the second data subset associated with the second seismic source;
receiving an input indicating that a distance between the first seismic source and the second seismic source is greater than or equal to a threshold value;
filtering the second data subset from the seismic data set to remove the second data subset from seismic data set to generate a filtered seismic data set in response to receiving the input; and
generating a coherence volume based on the filtered seismic data set.

2. The method of claim 1, wherein the input is received as a portion of the seismic data set.

3. The method of claim 1, wherein the threshold value is approximately 100 m.

4. The method of claim 1, wherein the threshold value is associated with dimensions of an area of a subsurface formation being surveyed.

5. The method of claim 1, wherein the threshold value is associated with a distance between two adjacent streamers each having a receiver disposed thereon and utilized in the collection of the seismic data set.

6. The method of claim 1, comprising determining a portion of the seismic data set as corresponding to the second data subset based on a seismic signature associated with the second seismic source.

7. The method of claim 1, wherein the seismic data set comprises shot records recorded from a marine survey system.

8. The method of claim 1, wherein the input comprises metadata indicative of the distance between the first seismic source and the second seismic source received in conjunction with the seismic data set.

9. The method of claim 1, comprising generating a first seismic image based on the coherence volume.

10. A system, comprising:
a first seismic source configured to impart a first plurality of seismic signals associated with a first data subset;
a second seismic source configured to impart a second plurality of seismic signals associated with a second data subset; and
a processor coupled to the first seismic source and the second seismic source wherein the processor is configured to:
receive a seismic data set comprising the first data subset associated with the first seismic source and the second data subset associated with the second seismic source;

receive an input indicating that a distance between the first seismic source and the second seismic source is greater than or equal to a threshold value;

filter the second data subset from the seismic data set to remove the second data subset from seismic data set to generate a filtered seismic data set in response to receiving the input; and generate a coherence volume based on the filtered seismic data set.

11. The system of claim 10, wherein the threshold value is based on a dimension of an area of a subsurface region associated with the first data set.

12. The system of claim 11, wherein the threshold value is between one-fourth and one-half of the dimension of the area of the subsurface region.

13. The system of claim 10, wherein the processor is configured to determine a portion of the seismic data set as corresponding to the second data subset based on a seismic signature associated with the second seismic source.

14. The system of claim 10, wherein the input is received as a portion of the seismic data set or in conjunction with the seismic data set.

15. The system of claim 14, wherein the processor is configured to generate a conformation request to filter the second data subset when the distance is within a percentage of the threshold value.

16. One or more tangible, non-transitory, machine-readable media comprising instructions configured to cause a processor to:

transmit a first signal to a first seismic source to impart a first plurality of seismic signals associated with a first data subset;

transmit a second signal to a second seismic source to impart a second plurality of seismic signals associated with a second data subset;

receive a seismic data set the first data subset associated with the first seismic source and the second data subset associated with the second seismic source;

receive an input indicting that a distance between the first seismic source and the second seismic source is greater than or equal to a threshold value;

filter the second data subset from the seismic data set to remove the second data subset from seismic data set to generate a filtered seismic data set in response to receiving the input; and generate a coherence volume based on the filtered seismic data set.

17. The one or more machine-readable media of claim 16, wherein the instructions cause the processor to identify the second data subset based on a seismic signature associated with the second seismic source.

18. The one or more machine-readable media of claim 16, wherein the input is received as a portion of the seismic data set or in conjunction with the seismic data set.

19. The one or more machine-readable media of claim 16, wherein the instructions cause the processor to filer the second data subset by slicing a portion of the seismic data set including the second data subset.

20. The one or more machine-readable media of claim 16, wherein the instructions cause the processor to generate a first seismic image based on the coherence volume.

\* \* \* \* \*